United States Patent
Kramer

[15] 3,672,577
[45] June 27, 1972

[54] FLUID BED GRID PLATE ASSEMBLY
[72] Inventor: Walter W. Kramer, Allentown, Pa.
[73] Assignee: Fuller Company, Catasauqua, Pa.
[22] Filed: Oct. 15, 1970
[21] Appl. No.: 80,888

[52] U.S. Cl............................239/557, 239/598, 23/288.35,
   34/57 A, 266/21
[51] Int. Cl..........................................................B05b 1/06
[58] Field of Search.................239/548, 556, 557, 558, 559,
   239/597, 598, 601, 602; 23/284, 288.3 S; 34/10, 57
   A; 263/21 A; 266/21

[56] References Cited

UNITED STATES PATENTS

| | | | |
|---|---|---|---|
| 3,508,341 | 4/1970 | Price | 34/57 A |
| 2,841,476 | 7/1958 | Dalton | 266/21 X |
| 3,057,701 | 10/1962 | Coates et al. | 23/284 |
| 3,089,251 | 5/1963 | Helbig et al. | 34/57 A |
| 3,277,582 | 10/1966 | Munro et al. | 34/57 A |

Primary Examiner—M. Henson Wood, Jr.
Assistant Examiner—Michael Y. Mar
Attorney—Jack L. Prather and Frank H. Thomson

[57] ABSTRACT

This invention relates to a grid plate assembly for a fluid bed reactor including an apertured grid plate having nozzle elements in the apertures. The apertures and nozzle elements are structured to prevent dislodgement of the nozzle elements from the grid plate during use of the assembly yet permit ready removal of the nozzle elements from the apertures when desired.

9 Claims, 4 Drawing Figures

PATENTED JUN 27 1972 3,672,577

INVENTOR
WALTER W. KRAMER

BY Frank H. Thomson
Jack L. Prather
ATTORNEYS

FLUID BED GRID PLATE ASSEMBLY

BACKGROUND OF THE INVENTION

The present invention relates to a fluid bed reactor such as that shown in U.S. Pat. No. 2,841,476 and in particular to a grid and nozzle assembly for such a reactor.

A fluidized bed reactor of the type to which the present invention relates includes a reactor vessel in which a grid plate is mounted dividing the vessel into an upper or reaction chamber and a lower or plenum chamber. A granular material which is to be fluidized is disposed within the upper chamber and supported on the grid plate. The grid plate is provided with a plurality of gas apertures therethrough and air or other gaseous fluid under pressure is supplied to the lower plenum chamber. The gas passes through the apertures in the grid plate and fluidizes the granular material. Heat is supplied to the fluid bed and thermal processing of material is carried out within the bed. The grid plate is conventionally made of a refractory material in order to permit the thermal processing of material in the reactor at high temperatures.

In order to achieve proper distribution of the air which fluidizes the granular material and to prevent back sifting of the granular material, it has been found necessary to mount a gas distributor nozzle or tuyere in each of the apertures in the grid plate. The air which is used to fluidize the granular material is under pressure tends to dislodge the nozzles or tuyeres from the apertures in the grid plate. Prior to the present invention, there have been several proposals for retaining the nozzles in the apertures of the grid plate.

As shown in U.S. Pat. No. 2,841,476, one proposal is to screw the nozzles into the grid plate. Because a refractory material must be used for grids used in high temperature fluidized bed reactors and refractories do not lend themselves to threading, this technique has not been satisfactory.

A second proposal is to make the nozzles heavy enough so that they will be held in the grid by their own weight. When large amounts of air are used for fluidizing, this technique has necessitated the use of extremely heavy nozzles and has not been altogether satisfactory. The nozzles still have a tendency to be dislodged from the grid.

A third technique is to have the nozzles pass through the grid plate and be secured by means such as a nut to the lower side of the grid. Such an arrangement is shown in U.S. Pat. No. 3,040,439. This arrangement has the disadvantage that if it becomes necessary to replace one of the nozzles, the fastening nut is usually frozen to the thread and cannot be loosened.

SUMMARY OF THE INVENTION

It is, therefore, the principal object of the present invention to provide a nozzle and nozzle assembly fluidized bed grid which overcomes the aforementioned disadvantages of present apparatus.

It is an additional object of this invention to provide a tuyere for a fluidized bed grid assembly which will remain in place when the assembly is in use, and may be easily replaced should the tuyere become damaged.

In general, the foregoing and other objects will be carried out by providing in combination, a grid plate for fluid bed reactors having a plurality of apertures therethrough, said apertures having walls defining a lower portion and a communicating upper portion with a truncated conical shape, the diameter of said upper portion being larger than that of said lower portion so as to form a circumferential shoulder at the zone of communication between said portions; a hollow nozzle element disposed in each of said upper portions, said nozzle elements comprising a head and a downwardly and outwardly tapering body spaced from said upper portion walls; and sealing means between said upper portion walls and said body to prevent dislodgement of said nozzle elements.

The objects of this invention will also be carried out by providing a nozzle element for use in a fluid bed reactor comprising a hollow body having ahead and downwardly and outwardly tapering sidewalls with the head of said body being closed; said head having at least one gas passage therethrough.

BRIEF DESCRIPTION OF THE DRAWINGS

The invention will be described in connection with the annexed drawing wherein.

DESCRIPTION OF THE PREFERRED EMBODIMENT

The instant invention is applicable to grid plates of any diameter or thickness used in fluid bed reactors. It is especially directed to grid plates made of a refractory material, whether of brick or other refractory material for use in high temperature fluid bed process operations and will be discussed in connection therewith.

Figure 1:
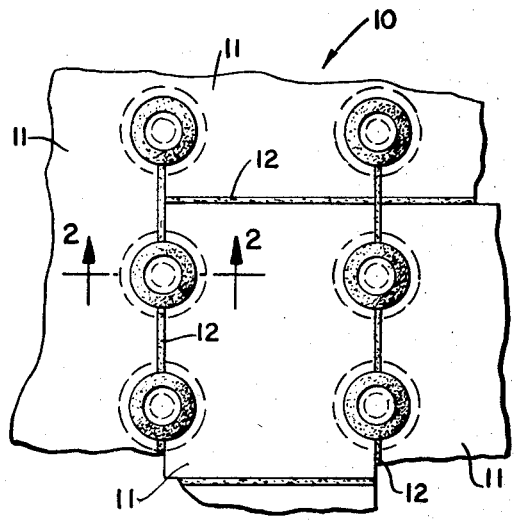
FIG. 1 is a partial plan view of a grid plate forming a part of the present invention.
Figure 2:
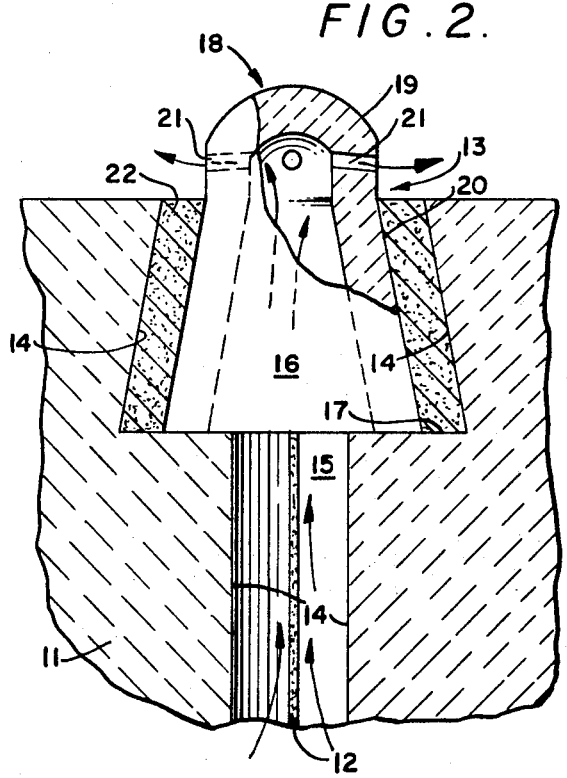
FIG. 2 is a sectional view on an enlarged scale taken on the line 2—2 of FIG. 1.

Referring to the drawings, there is shown in FIGS. 1 and 2 a unitary grid plate 10 comprising a series of cast refractory sections 11 joined together by mortar 12 at their abutting joints. While only a portion of the grid plate 10 has been shown, it will be understood that the grid comprises any number of these sections desired so as to form a grid of the diameter and shape needed for a particular reactor. The size and shape of the grid plate, except as hereinafter noted, form no part of the instant invention.

Spaced as desired in the grid plate 10 are a plurality of apertures 13 extending therethrough, the location of the apertures 13 and the number thereof is governed by the requirements of the particular reactor in which the grid plate is to be used. The apertures 13 have walls 14 defining a generally cylindrical lower portion 15 and a communicating upper portion 16 with a truncated conical shape. The greatest cross-sectional diameter of the upper portion 16 is larger than that of the smallest cross-sectional diameter of the lower portion. A circumferential shoulder 17 is formed at the area where the lower portion 15 communicates with the upper portion 16 of the aperture 13.

For ease of construction of the grid plate, one-half of the shape of each of the apertures 13 may be preformed in each individual section 11 as the refractory material is cast or brick is being made. When the preformed sections 11 are then united to form the grid, the half portions of each aperture of each abutting grid mate to form an aperture 13 of the desired shape. This is best shown in FIGS. 1 and 2.

Figure 3:
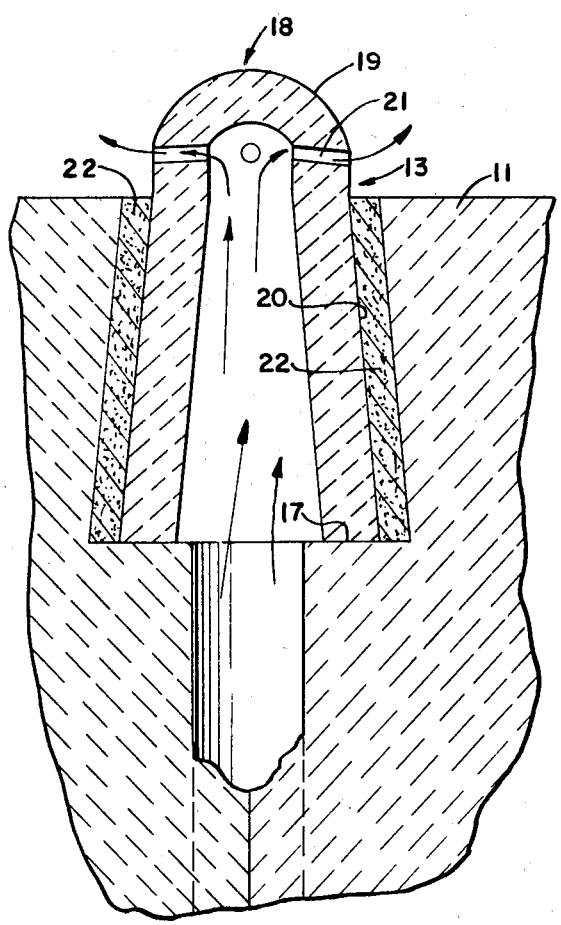
FIG. 3 is a sectional view of an alternate embodiment of the present invention.

FIG. 3 illustrates an alternate embodiment wherein during casting, removable forms can be used so that the apertures can be formed in the body of the cast sections and not solely at the periphery thereof. By whatever means formed, it is required that the apertures 13 have in their upper portion 16 the truncated conical shape shown in FIGS. 2, 3, and 4.

Nozzle elements 18 are hollow, truncated conical shaped bodies having a rounded head 19 and a body 20 with a downwardly and outwardly tapering shape set in each of the apertures 13. The nozzle elements 18 are hollow and contain in the head 19 core holes 21 located near the head to permit passage of the fluidizing gas from the plenum chamber (not shown) below the grid plate 10 into the reaction chamber above the grid plate. The openings 21 are preferably angled downwardly with respect to the horizontal toward the grid plate so that when air is no longer supplied to the fluid bed and the granular material in the bed settles, it will not sift through the holes 21 into the plenum.

It is generally desired to have the head 19 of the nozzle 18 extended above the upper surface of the grid. For this purpose, the depth of the upper portions 16 of the apertures 13 and length of the body 20 of the nozzle element 18 are adjusted accordingly.

The downwardly and outwardly tapering body 20 of the nozzle element 18 is formed so as to be substantially parallel with the walls 14 of the upper portion 16 of the aperture. The greatest cross-sectional diameter of the body 20 is made slightly smaller than the smallest cross-sectional diameter of the upper portion 16 of aperture 13 so that the nozzle element 18 can be freely inserted and removed from the upper portion 16.

It is required that the nozzle elements 18 be inserted so that their base rests directly on the shoulders 17 of the apertures 13. The space between the body 20 and the walls 14 of the upper portion 16 is filled with a sealer or grout 22. The sealer or grout may be a cement or castable material or it may be a granular material such as sand which is tamped between the walls of the aperture 13 and the walls of the nozzle element 18. Preferably such grout material has a strength less than that of the adjacent refractory section 11 and nozzle element 18.

Because of the shape of the body 20 of the nozzle element 18 and the shaped upper portion 16 of the aperture 13 and the interposition of the sealing means therebetween, the upward force of the fluidizing gas on the nozzle element cannot dislodge the nozzle element. In fact, as the upward force of the fluidizing gas tends to lift the nozzle element 18 out of the aperture, it compacts the grout 22 and tightens the hold of the grid on the nozzle. Thus, a self-tightening fastener between the grid and the nozzle has been provided.

If, however, the nozzle element 18 should fail during operation and must be replaced, the shape of the space between the body and upper portion permits ready removal of the sealing means 22 from all areas of the upper portion 16 of the aperture 13 and consequently permits the withdrawal of the nozzle element from the aperture. The nozzle can thus be removed through the top of the grid and access to the lower plenum chamber is not necessary.

Figure 4:
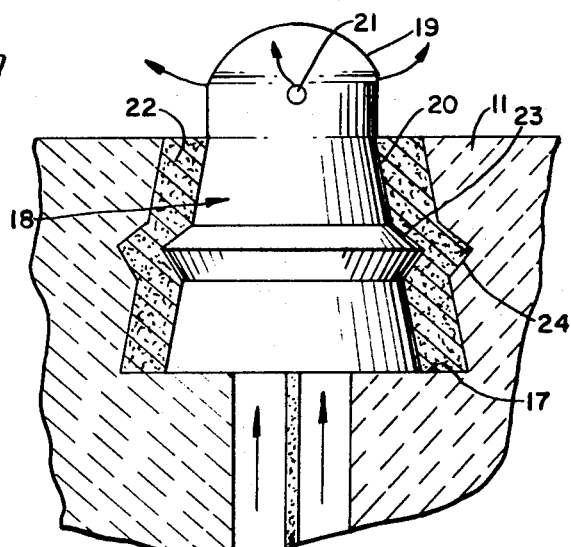
FIG. 4 is a view, partially in section, of a further modification of the present invention.

In the embodiment of the invention shown in FIG. 4, the nozzle element 18 can be provided with a circumferential apron 23 about a portion of the body 20 and the upper portion 16 of the aperture 13 is provided with a corresponding groove 24. This modification of the invention can be used in such situations where unusually high fluidizing gas pressures are to be used in order to insure that the nozzle element 18 will not be dislodged from the upper portion 16 of the aperture 13. Here again, however, it is important that the bottom of the nozzle element 18 rest on the shoulder 17 so as to prevent any of the sealing material 22 from coming between the bottom of the nozzle element and shoulder thereby making it difficult to remove the nozzle element should it need replacement.

As to materials, the cast sections may be of formed brick or of any castable refractory material commonly used in making grid plates for fluid bed reactors. The nozzle is made of a suitable material, compatible with the fluidized bed process operation, such as ceramic mullite, porcelain, alundum, corundum, metal alloys, metal ceramics, teflon, nylon and the like. These materials are listed by way of example and not by way of limitation. The sealing means, as noted, may be a cement or castable material, preferably one softer than the material used in the cast sections or the nozzle element.

It should be apparent from the foregoing that the objects of this invention have been carried out. A novel nozzle and grid assembly have been provided which insures that the nozzle will be held in the grid plate yet permit easy removal should this be necessary. The nozzle is held in place by more than a mere fastener or more than the grout material.

It will be understood that it is intended to cover all changes and modifications of the disclosure of the invention herein chosen for the purpose of illustration which do not constitute departures from the spirit and scope of the invention.

What is claimed is:

1. In combination, a grid plate for fluid bed reactors having a plurality of apertures therethrough, said apertures having walls defining a lower portion and a communicating upper portion with a truncated conical shape, the diameter of said upper portion being larger than that of said lower portion so as to form a circumferential shoulder at the zone of communication between said portions; a hollow nozzle element disposed in each of said upper portions, said nozzle elements comprising a head and a downwardly and outwardly tapering body spaced from said upper portion walls; and sealing means between said upper portion walls and said body to prevent dislodgement of said nozzle elements.

2. The combination of claim 1 wherein said grid plate comprises a plurality of abutting preformed sections of refractory material, said sections having recessed areas in at least one side wall which mate with corresponding recessed areas of abutting sections to form said apertures, and said sealing means is a refractory material.

3. The combination of claim 1 wherein said body has an outwardly projecting circumferential apron and said upper portion wall has a groove mating therewith.

4. The combination of claim 1 wherein the downwardly and outwardly tapering body of each nozzle element is substantially parallel with the upper portion walls of the aperture in which it is disposed.

5. The combination of claim 4 wherein a nozzle element is seated on a shoulder in each of said apertures.

6. The combination of claim 5 wherein said grid plate comprises a plurality of abutting preformed sections of refractory material, said sections having recessed areas in at least one side wall which mate with corresponding recessed areas of abutting sections to form said apertures, and said sealing means is a refractory material.

7. For use in combination with a fluid bed reactor grid having a plurality of apertures therethrough, each having walls defining a lower portion and a communicating upper portion with a truncated conical shape, a nozzle element comprising a hollow body having a head and downwardly and outwardly tapering side walls adapted to extend into the upper portion of an aperture in a fluid bed reactor grid, with the head of said body being closed and having at least one gas passage therethrough.

8. The nozzle element of claim 7 wherein said side walls terminate in a flat base.

9. The nozzle element of claim 8 wherein said gas passage is angled downwardly from the horizontal.

* * * * *